United States Patent
Tjahjono et al.

(10) Patent No.: US 10,148,618 B2
(45) Date of Patent: Dec. 4, 2018

(54) NETWORK ISOLATION

(71) Applicant: ABB Technology AG, Zurich (CH)

(72) Inventors: Danurahardjo Tjahjono, Dublin, CA (US); Prabhat Regmi, Fremont, CA (US)

(73) Assignee: ABB Schweiz AG, Baden (CH)

( * ) Notice: Subject to any disclaimer, the term of this patent is extended or adjusted under 35 U.S.C. 154(b) by 266 days.

(21) Appl. No.: 15/175,100

(22) Filed: Jun. 7, 2016

(65) Prior Publication Data

US 2017/0353431 A1    Dec. 7, 2017

(51) Int. Cl.
| | |
|---|---|
| H04L 29/06 | (2006.01) |
| H04L 12/707 | (2013.01) |
| H04L 12/931 | (2013.01) |
| H04L 29/08 | (2006.01) |
| H04L 12/46 | (2006.01) |
| H04L 12/741 | (2013.01) |

(52) U.S. Cl.
CPC ...... *H04L 63/0227* (2013.01); *H04L 12/4641* (2013.01); *H04L 45/22* (2013.01); *H04L 49/354* (2013.01); *H04L 63/10* (2013.01); *H04L 63/20* (2013.01); *H04L 69/325* (2013.01); *H04L 45/745* (2013.01)

(58) Field of Classification Search
CPC .................................................. H04L 63/0227
See application file for complete search history.

(56) References Cited

U.S. PATENT DOCUMENTS

| | | | |
|---|---|---|---|
| 5,920,699 A | 7/1999 | Bare | |
| 6,741,592 B1 | 5/2004 | Edsall et al. | |
| 6,914,905 B1 | 7/2005 | Yip et al. | |
| 7,095,741 B1 | 8/2006 | Joshi et al. | |
| 7,200,145 B1 | 4/2007 | Edsall et al. | |

(Continued)

FOREIGN PATENT DOCUMENTS

| | | | | |
|---|---|---|---|---|
| WO | 2004/090741 A2 | 10/2004 | | |
| WO | WO-2004090741 A2 | * 10/2004 | ......... | H04L 63/0272 |

OTHER PUBLICATIONS

"Shared-Medium-Based Subscriber Ring Access to ATM Networks". IBM Technical Disclosure Bulletin, vol. 37, Issue No. 4B, Apr. 1, 1994, US (Year: 1994).*

(Continued)

*Primary Examiner* — Shawnchoy Rahman
(74) *Attorney, Agent, or Firm* — Barnes & Thornburg LLP

(57) ABSTRACT

One or more techniques and/or systems are provided for network isolation. For example, nodes within a mesh of devices may be configured with routing rules, main routing tables, and alternative routing tables, such as at a layer-3 network layer. The routing rules may specify that packets received from downstream are to be routed upstream to either a gateway or a backhaul device for evaluation as to whether such packets are allowed to be communicated back downstream to destination recipients using main routing tables. An isolation rule may be configured to specify whether to block or allow packets. In an example, the gateway may either block or allow packets based upon whether a source and destination are within a same virtual local area network or are within different virtual local area networks. In this way, selective device isolation may be provided, such as at the layer-3 network layer.

20 Claims, 11 Drawing Sheets

(56) References Cited

U.S. PATENT DOCUMENTS

| | | |
|---|---|---|
| 7,808,992 B2 | 10/2010 | Homchaudhuri et al. |
| 7,881,296 B2 | 2/2011 | Joshi et al. |
| 8,059,648 B2 | 11/2011 | Wong |
| 8,369,344 B1 | 2/2013 | Krishnan et al. |
| 8,437,357 B2 | 5/2013 | Oman |
| 8,625,603 B1 | 1/2014 | Ramakrishnan et al. |
| 8,737,398 B2 | 5/2014 | Soni |
| 8,875,233 B2 | 10/2014 | Baykal et al. |
| 2004/0024943 A1* | 2/2004 | Lupien, Jr. ............ G06F 13/404 710/305 |
| 2006/0062187 A1 | 3/2006 | Rune |
| 2007/0192862 A1 | 8/2007 | Vermeulen et al. |
| 2007/0274230 A1* | 11/2007 | Werber ................ H04L 41/082 370/254 |
| 2010/0254396 A1 | 10/2010 | Oman |
| 2012/0015410 A1 | 1/2012 | Anzai et al. |
| 2012/0331142 A1 | 12/2012 | Mittal et al. |
| 2013/0152187 A1* | 6/2013 | Strebe .................. H04L 63/101 726/11 |
| 2014/0369236 A1* | 12/2014 | Kondo ................ H04W 40/12 370/254 |

OTHER PUBLICATIONS

Int. Search Report/Written Opinion cited in PCT Application No. PCT/US2017/036080 dated Aug. 21, 2017, 15 pgs.

\* cited by examiner

NETWORK ISOLATION

BACKGROUND

Some types of device meshes use a layer-2 network layer with a virtual local area network (VLAN). The layer-2 network layer may comprise a data link where data packets are encoded or decoded into bits. A Media Access Control (MAC) sublayer controls how devices access data, and controls permission for transmitting the data, such as where packets are sent to specific switch ports based on destination MAC addresses. The layer-2 network layer uses physical addressing, and thus instead of routing packets to local peers, a destination MAC address is resolved through an Address Resolution Protocol (ARP) to communicate with a local peer. VLAN tags, carried within internet protocol (IP) packets of the layer-2 network layer, may be used to provide isolation between devices. Providing isolation between certain devices can improve security of a device mesh. For example, devices on different VLANs may be isolated from one another to improve security between VLANs at the layer-2 network layer.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for network isolation are provided herein. For example, a mesh of devices may comprise one or more devices (e.g., wired client devices or wireless client devices), one or more nodes (e.g., a wireless mesh of nodes having wireless connectivity), and a gateway that may have connectivity to a backhaul device (e.g., a switch or router, which may be used to connect the mesh of devices to a core network or backbone network). The mesh of devices may utilize a layer-3 network layer supporting internet protocol (IP) routing. As provided herein, the mesh of devices may be configured to provide selective isolation between devices of the mesh of devices. For example, a node may be configured with a first routing rule and a second routing rule. The first routing rule may specify that a first main routing table is to be used for routing a packet (e.g., an unmarked packet) when the packet is received from a device upstream of the node. The first main routing table may utilize destination based routing such as a main route used to route the packet downstream to a destination device that is a destination recipient of the packet. The second routing rule may specify that a first alternative routing table is to be used for the packet when the packet is received from a device downstream of the node (e.g., a marked packet originating from a source device downstream of the node). The first alternative routing table may indicate that packets received from downstream are to be routed upstream. In an example, the second routing rule may have a higher priority than the first routing rule, and thus is evaluated for applicability first.

The gateway may be configured with a third routing rule and a fourth routing rule. The third routing rule may specify that a second main routing table is to be used for routing the packet when the packet is received from a device upstream of the gateway, such as from the backhaul device. The second main routing table may utilize destination based routing such as a main route used to route the packet downstream to the destination device. The fourth routing rule may specify that a second alternative routing table is to be used for the packet when the packet is received from a device downstream of the gateway (e.g., a marked packet originating from the source device). The second alternative routing table may indicate that packets received from downstream are to be routed upstream, such as to the backhaul device. In an example, alternative routing tables may be defined, such as for use by the gateway, for individual virtual local area networks (e.g., an alternative routing table may comprise routing entries for devices within a same virtual local area network, thus packets may be routed between devices within that same virtual local area network using the alternative routing table, otherwise packets may be routed to the backhaul device by default if the alternative routing table lacks an entry for a destination device). In an example, the fourth routing rule may have a higher priority than the third routing rule, and thus is evaluated for applicability first. In an example where same-virtual local area network (same-VLAN) routing is enabled, the gateway may be configured with a same-VLAN rule specifying that packets are allowed to be routed back downstream by the gateway for communication between devices within a same VLAN (e.g., without being routed upstream to the backhaul device for evaluation using isolation rules) and that packets are not allowed to be routed back downstream by the gateway for communication between devices within different VLANs.

An isolation rule may be configured to specify whether to block or allow the packet. For example, the isolation rule may specify which devices are allowed or not allowed to be destination recipients for communication by the source device that is sending the packet to the destination device. If the isolation rule specifies that the source device is allowed to communicate with the destination device, then the packet may be routed back downstream to the destination device. If the isolation rule specifies that the source device is not allowed to communicate with the destination device, then the packet is blocked. In this way, the packet is routed from the source device upstream through the mesh of devices to the gateway or the backhaul device (e.g., based upon the use of alternative routing tables), which will use the isolation rule to determine whether to block the packet or route the packet back downstream through the mesh of devices to the destination device (e.g., based upon the use of main routing tables). Accordingly, security is improved for the mesh of devices by providing selective isolation between devices.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
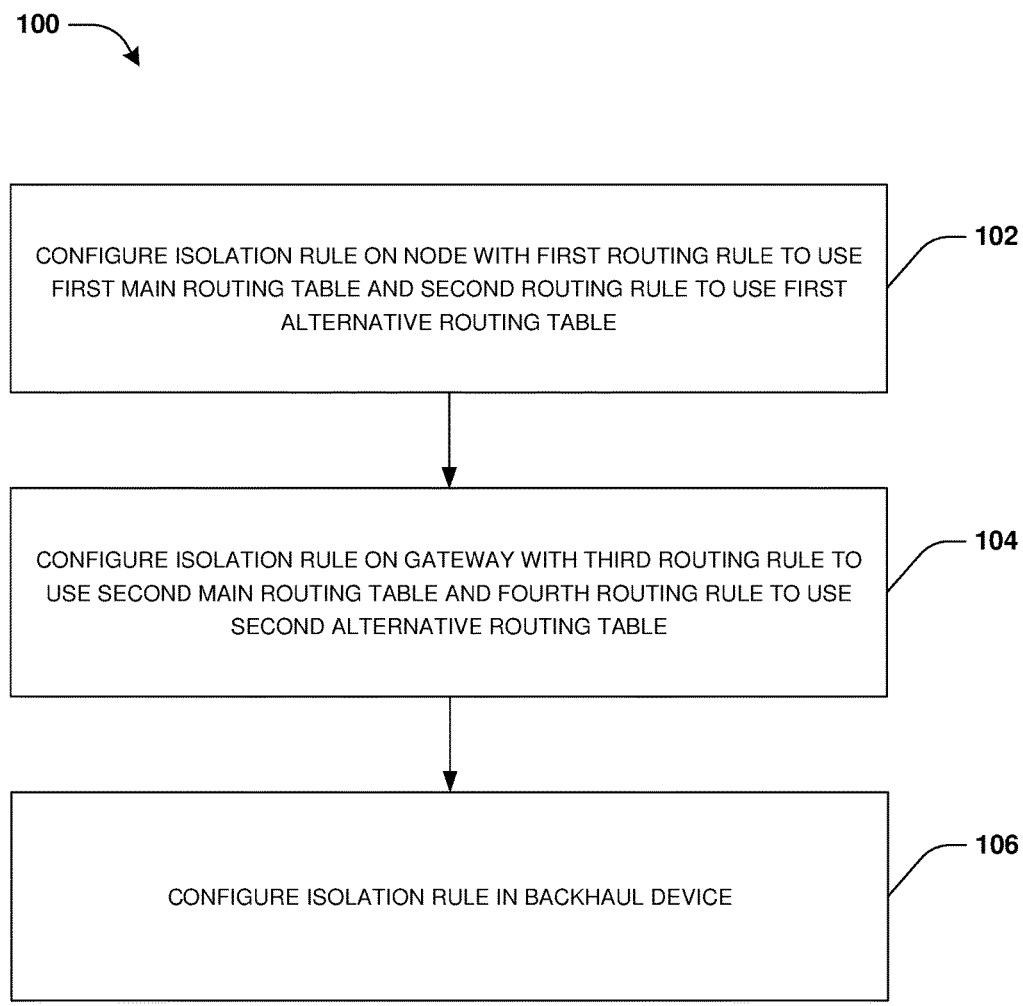
FIG. 1 is a flow diagram illustrating an exemplary method of providing network isolation.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

One or more computing devices and/or techniques for providing network isolation are provided. For example, routing rules may be defined for nodes within a mesh of devices, such as a wireless mesh of devices utilizing a layer-3 network layer with internet protocol (IP) routing. The routing rules may specify whether a main routing table or an alternative routing table is to be used for looking up a route to use for routing a packet. For example, a higher priority routing rule may specify that packets, such as marked packets, received from downstream are to use the alternative routing table comprising an alternative route used to route packets upstream for evaluation by a backhaul device using isolation rules specifying which devices are allowed or not allowed to communication with one another. A lower priority routing rule may specify that packets, such as unmarked packets, received from upstream are to use the main routing table comprising a main route used to route packets downstream to a destination device.

A gateway may be configured with a same-virtual local area network (same-VLAN) routing rule that allows for same-VLAN communication (e.g., communication between devices within the same VLAN is allowed) and blocks communication between different VLANs (e.g., communication between devices within different VLANs is blocked). Using priority rules that have different priorities promotes efficient routing of packets to either the gateway or the backhaul node that are configured for selectively allowing or blocking such packets from reaching destinations, thus improving security by blocking packets that could otherwise compromise sensitive data, device operability, and/or security. In this way, security may be improved for the mesh of devices in an efficient manner by providing for selective device isolation such as within a layer-3 network layer and/or by providing same-VLAN communication, which may otherwise by unavailable for the layer-3 network layer. Otherwise, attempting to use packet filtering and/or firewalls to inhibit packets from reaching subnets of different VLANs is inefficient and prevents packets from doing inter-VLAN communication. Selectively providing isolation between certain devices at the layer-3 network layer improves network security in an efficient manner because unauthorized communication, such as communication attempts by a malicious device (e.g., a malicious device attempting to send malicious instructions to a device within the network or attempting to extract sensitive data from the device), may be blocked.

An embodiment of network isolation is illustrated by an exemplary method 100 of FIG. 1. A mesh of devices may comprise one or more devices (e.g., a device (1A) 212, a device (1B) 214, a device (2A) 216, and a device (2B) of FIG. 2A), nodes (e.g., a first node 208, a second node 210, and a third node 206 of FIG. 2A), and/or a gateway (e.g., gateway 204 of FIG. 2A) with connectivity to a backhaul device (e.g., backhaul device 202 of FIG. 2A) such as a backhaul switch or router. In an example, the mesh of devices may comprise a wireless device mesh using a layer-3 network layer supporting IP routing. In contrast to a layer-2 network layer, the layer-3 network layer utilizes switching and routing technology and uses logical paths for transmitting data from node to node. The layer-3 network layer is responsible for logical addressing, internetworking, and routing and forwarding of IP. Routing operates at the layer-3 network layer, where packets are sent to a specific next-hop IP address based upon a destination IP address. In an example, a wireless mesh of devices may utilize a layer-3 network layer with IP routing. However, the layer-3 network layer may not support VLAN tags, and thus isolation between devices may be unavailable. Packet filtering and firewalls to block packets on every mesh node to ensure packets cannot reach subnets of different VLANs may be used in an attempt to provide device isolation at the layer-3 network layer, but such techniques are inefficient and do not allow for inter-VLAN communication. Accordingly, as provided herein, device isolation may be provided using IP routing rules and alternative routing tables used to route packets to the backhaul switch for evaluation using isolation rules that either selectively allow or block such packets.

At 102, an isolation rule may be configured on node with a first routing rule and a second routing rule. In an example, the second routing rule may have a higher priority than the first routing rule, such that the second routing rule may be evaluated first for determining whether the second routing rule is applicable to a packet. The first routing rule may specify that a first main routing table is to be used for routing packets (e.g., unmarked packets) received from a device upstream of the node. The first main routing table may comprise a main route used to reach a destination device using standard destination routing techniques. In this way, packets that are approved by the backhaul device (e.g., based upon an isolation rule allowing such communication) or by the gateway device (e.g., based upon a same-VLAN routing rule allowing such communication) may be routed by the node back downstream to the destination device using the first routing rule and the first main routing table.

The second routing rule may specify that a first alternative routing table is to be used for packets received from a device downstream of the node. The first alternative routing table may comprise an alternative route used to route packets upstream, as opposed to through the mesh of devices to the destination device, so that such packets can be evaluated by the backhaul device using isolation rules or by the gateway device using same-VLAN routing rules for providing selective isolation. In this way, the isolation rule applies to the node and/or any other node within the mesh of devices because packets may be evaluated using the first alternative routing table.

In an example, packets that are received from the device downstream of the node (e.g., received from a wireless device) may be marked, such as by a driver module (e.g., a wireless driver) associated with the node, to indicate that the first alternative routing table is to be used for routing (e.g., the mark may trigger the use/applicability of the second routing rule). The driver module may be instructed to not mark packets received the device upstream of the node (e.g., the absence of the mark may trigger the use/applicability of the first routing rule instead of the second routing rule). In an example, the node may store an indication of the device upstream of the node, and thus may use the indication to determine whether the packet was received from the device upstream of the node. If not, then the node may determine that the packet was received from the device downstream of the node. In another example, if the packet was received from a wired device, then an interface over which the packet was received may be evaluated to determine whether the packet was received from downstream or upstream (e.g., as opposed to marking the packet). In this way, one or more nodes (e.g., the first node 208, the second node 210, and the third node 206 of FIG. 2A) may be configured with routing rules specifying whether main routing tables with main routes used to reach destination devices downstream or alternative routing tables with alternative routes used to route packets upstream are to be used.

At 104, the isolation rule may be configured on the gateway with a third routing rule and a fourth routing rule. In an example, the fourth routing rule may have a higher priority than the third routing rule, such that the fourth routing rule may be evaluated first for determining whether the fourth routing rule is applicable to a packet. The third routing rule may specify that a second main routing table is to be used for routing packets, received from a device upstream of the gateway such as the backhaul device, back downstream to the destination device. The third main routing table may comprise a main route used to reach the destination device using standard destination routing techniques. In this way, packets that are approved by the backhaul device (e.g., based upon an isolation rule allowing such communication) or by the gateway device (e.g., based upon a same-VLAN routing rule allowing such communication) may be routed by the gateway back downstream to the destination device using the third routing rule and the second main routing table.

The fourth routing rule may specify that a second alternative routing table is to be used for packets received from a device downstream of the gateway. The second alternative routing table may comprise an alternative route used to route packets upstream such as to the backhaul device, as opposed to through the mesh of devices to the destination device, so that such packets can be evaluated by the backhaul device using isolation rules for providing selective isolation. In an example, the gateway may be configured to evaluate an interface over which a packet has arrived for determining whether the packet was received from upstream or downstream. In this way, the isolation rule applies to the gateway because packets may be evaluated using the second alternative routing table.

In an example, the gateway may be configured with a same-VLAN routing rule specifying that packets are allowed to be routed by the gateway back through the mesh of devices to the destination device (e.g., without being routed to the backhaul device) when packets are being communicated between devices within a same VLAN, and that packets for communication between devices within different VLANs are to be blocked.

At 106, the isolation rule may be configured in the backhaul device. For example, the backhaul device may either block or allow packets originating from a source device within the mesh of devices (e.g., a sender of a packet to the destination device) based upon an isolation rule specifying which devices are allowed or not allowed to be destination recipients for communication by the source device. For example, the isolation rule may specify that the packet, originating from the source device and having the destination device as a destination recipient, are to be blocked from being routed to the destination device. The isolation rule may specify that packets, originating from the source device and having a second device as the destination recipient, are allowed to be routed back downstream through the mesh of devices to the second device. In this way, the isolation rule may be provided in the node, other nodes within the mesh, the gateway, and the backhaul device (e.g., the isolation rule in the backhaul device provides for inter-VLAN communications).

In an example, the isolation rule may provide a guarantee that devices connected to the mesh of devices cannot communicate with one another, unless the isolation rule provides for such communication (e.g., a same-VLAN routing rule, implemented by the gateway, allowing for communication between devices within the same VLAN). For example, the gateway may send a packet to the backhaul device. Responsive to the backhaul device determining that a destination device is not in a backhaul network (e.g., the destination device is a device within the mesh of device), the backhaul device may send an address resolution protocol (ARP) message to the gateway asking who has the destination device. The gateway may send an ARP reply that the packet is to be routed back from the backhaul device to the gateway for providing inter-VLAN communication. In an example, the backhaul device may send the packet back to a VLAN port (e.g., an interface). In an example, the backhaul device may decide not to support inter-VLAN communication (e.g., based upon implementation of an isolation rule within the backhaul device), and thus may not send the packet back to the gateway. The packet may be distinguished, such as by the backhaul device, as either a new packet coming from the backhaul network or is an existing packet that initially came from the gateway. In this way, selective device isolation may be provided to the mesh of devices, such as for a wireless mesh of devices using a layer-3 network layer.

Figure 2A:
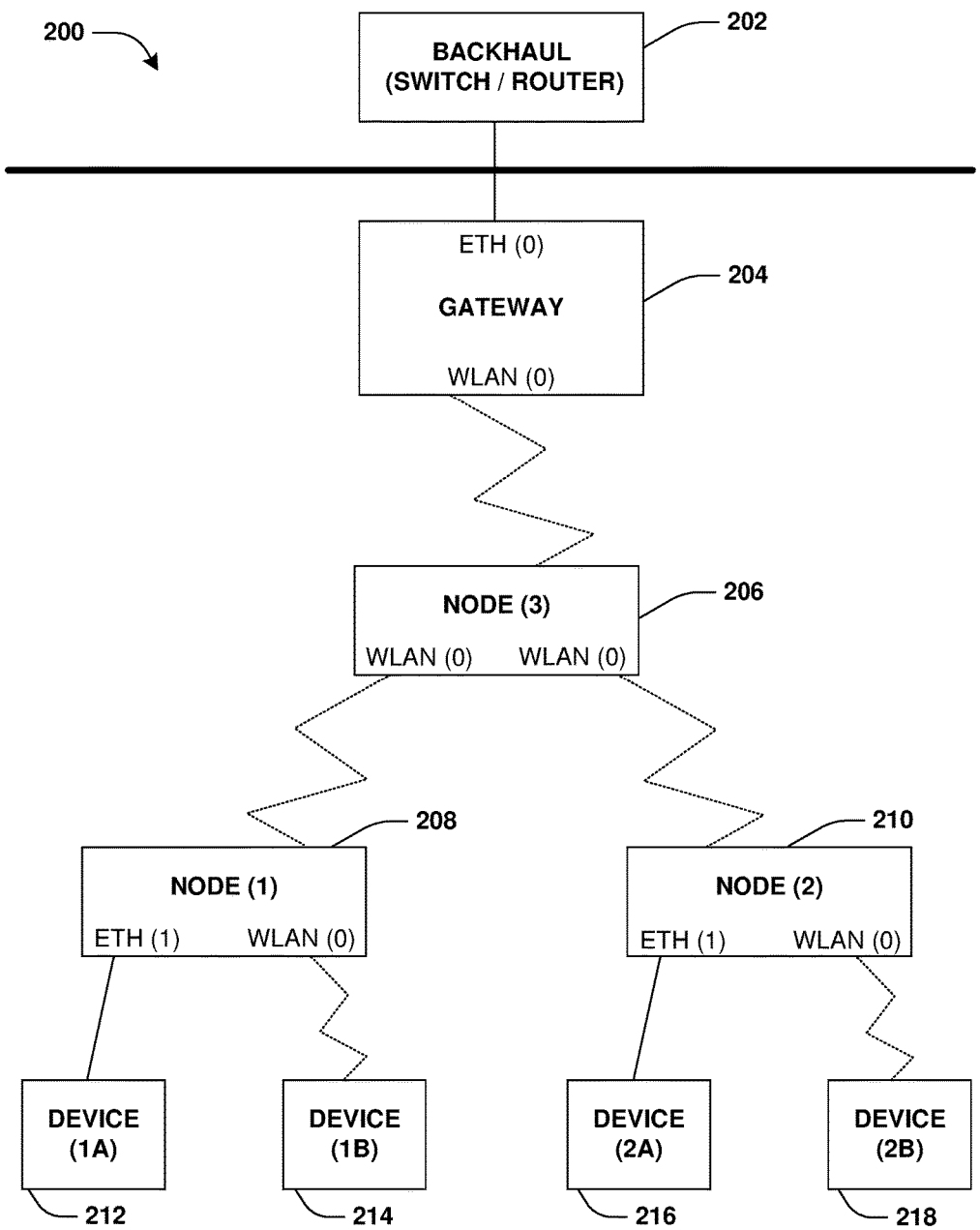
FIG. 2A is a component block diagram illustrating an exemplary system for providing network isolation.

FIGS. 2A-2F illustrate examples of a system 200 for providing network isolation. FIG. 2A illustrates a wireless mesh network comprising a first node 208, a second node 210, a third node 206, a gateway 204, and/or one or more devices. It may be appreciated that the wireless mesh network may comprise different or other nodes and/or devices than what is illustrated. A device (1A) 212 may be connected to the first node 208 through a wired connection such as using Ethernet connectivity ETH (1). A device (1B) 214 may be connected to the first node 208 through a wireless connection such as using a wireless local area network WLAN (0). A device (2A) 216 may be connected to the second node 210 through a wired connection such as using the Ethernet connectivity ETH (1). A device (2B) 218 may be connected to the second node 210 through a wireless connection such as using the wireless local area network WLAN (0). The first node 208 and the second node 210 may be connected to the third node 206 through wireless connections such as using the wireless local area network WLAN (0). The third node 206 may be connected to the gateway 204 through a wireless connection such as using the wireless local area network WLAN (0). The gateway 204 may be connected to a backhaul device 202 (e.g., a switch or router) over a wired connection such as using Ethernet connectivity ETH (0).

Figure 2B:
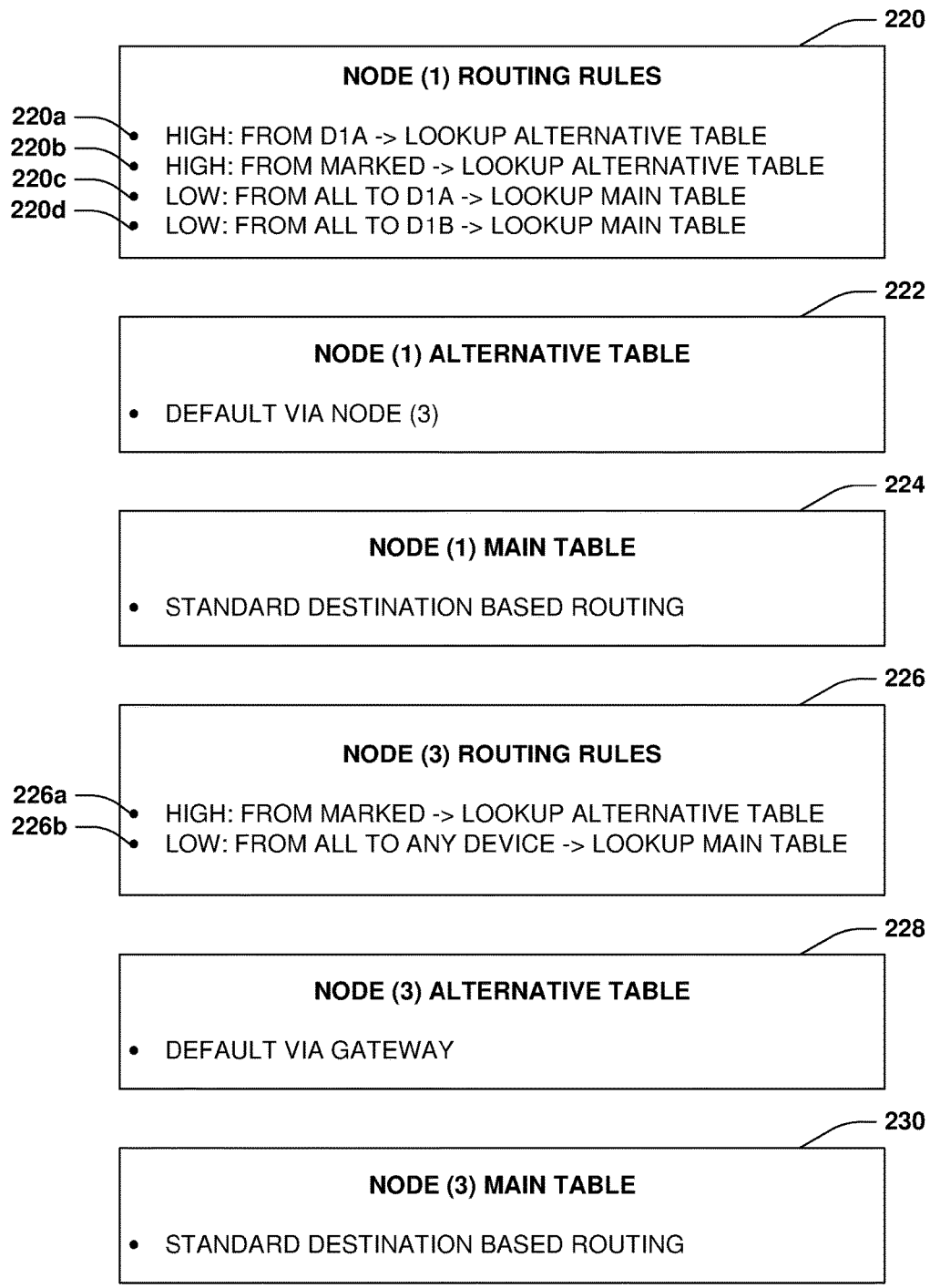
FIG. 2B is a component block diagram illustrating an exemplary system for providing network isolation, where routing rules, alternative routing tables, and main routing tables are defined.

FIG. 2B illustrates IP routing rules and routing tables configured for use by nodes, such as the first node 208 and the third node 206. First routing rules 220 may be defined for the first node 208. The first routing rules 220 may comprise a first higher priority rule 220a specifying that packets received from the device (1A) 212 (e.g., received from downstream) are to use a first alternative routing table 222 specifying that such packets are to be routed upstream to the third node 206. The first routing rules 220 may comprise a second higher priority rule 220b specifying that packets (e.g., marked packets received from the device (1B) 214, and marked by a wireless driver of the first node 208) are to use the first alternative routing table 222 specifying that such packets are to be routed upstream to the third node 206. The first routing rules 220 may comprise a first lower priority rule 220c specifying that packets, received from upstream and having the device (1A) 212 as a destination recipient, are to use a first main routing table 224 that routes packets using standard destination based routing. The first routing rules 220 may comprise a second lower priority rule 220d specifying that packets, received from upstream and having the device (1B) 214 as the destination recipient, are to use the first main routing table 224 that routes packets using standard destination based routing. Similarly, second routing rules may be defined for the second node 210, such as for routing packets associated with the device (2A) 216 and/or the device (2B) 218, specifying whether to use a second main routing table or a second alternative routing table for routing.

Third routing rules 226 may be defined for the third node 206. The third routing rules 226 may comprise a third higher priority rule 226a specifying that marked packets (e.g., packets received from downstream, and marked by a wireless driver of the third node 206) are to use a third alternative routing table 228 specifying that such packets are to be routed upstream to the gateway 204. The third routing rules 226 may comprise a third lower priority routing rule 226b specifying that packets received from upstream such as from the gateway 204, originating from any device, and having any other device as a destination recipient are to use a third main routing table 230 that routes packets using standard destination based routing.

Figure 2C:
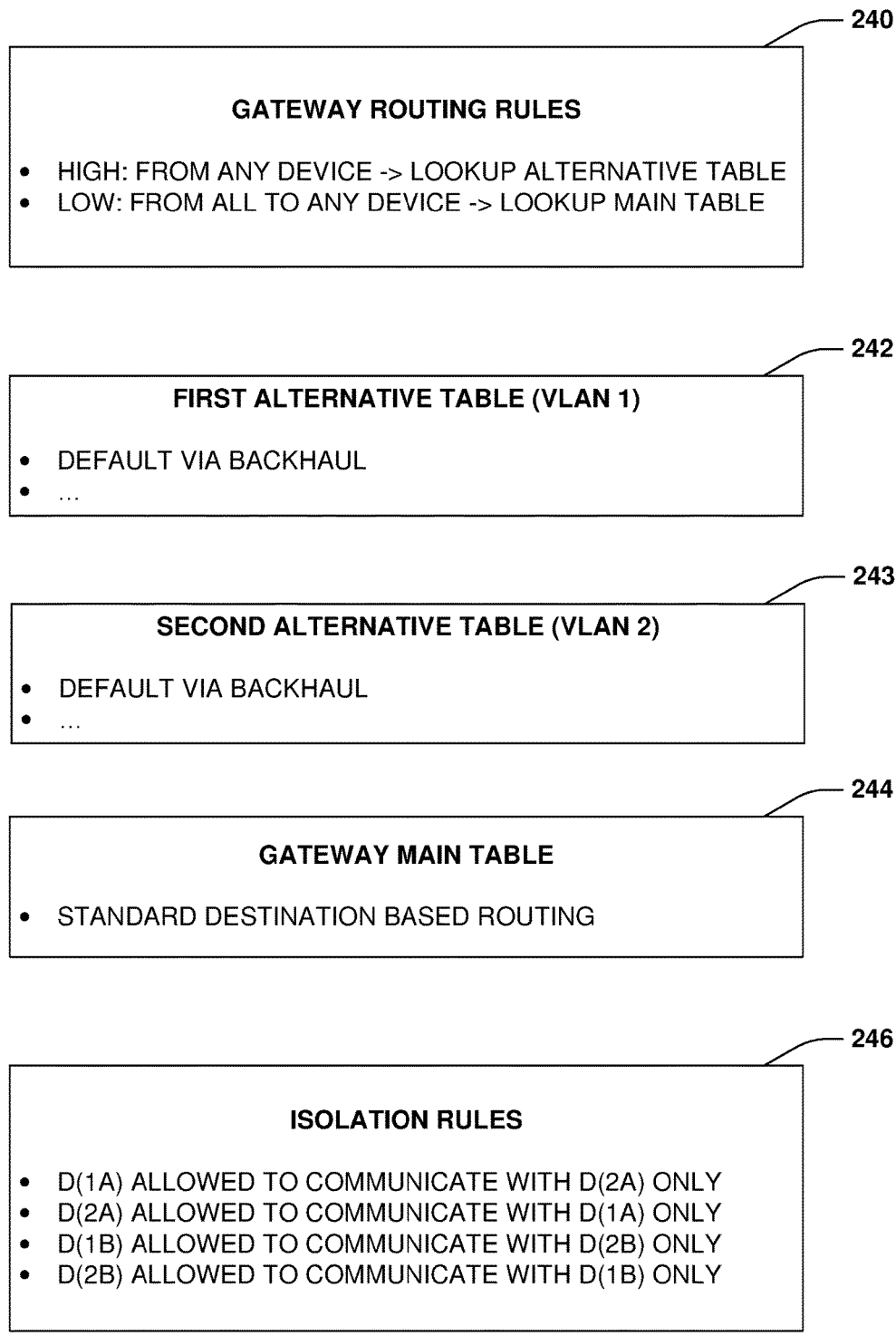
FIG. 2C is a component block diagram illustrating an exemplary system for providing network isolation, where routing rules, alternative routing tables, main routing tables, and isolation rules are defined.

FIG. 2C illustrates gateway routing rules 240 that are defined for the gateway 204. The gateway routing rules 240 may comprise a higher priority rule specifying that marked packets (e.g., packets received from any device downstream, and marked by a wireless driver of the gateway 204) are to use a first alternative routing table 242 for a first VLAN, a second alternative routing table 243 for a second VLAN, and/or other alternative routing tables for VLANs. If an alternative routing table comprises an entry for a destination device (e.g., because the destination device is within the same VLAN as a sender of a packet), then the packet may be routed to the destination device based upon the entry. If not, then the packet may be routed by default to the backhaul device 202. The gateway routing rules 240 may comprise a lower priority rule specifying that packets received from upstream such as from the backhaul device 202, originating from any device, and having any other device as a destination recipient are to use a main routing table 244 that routes packets using standard destination based routing.

Isolation rules 246 may be defined for use when evaluating whether to block or allow packets for routing back through the mesh to destination recipients. For example, the device (1A) 212 may be allowed to communicate only with device (2A) 216, device (2A) 216 may be allowed to communicate only with device (1A) 212, device (1B) 214 may be allowed to communicate only with device (2B) 218, and device (2B) 218 may be allowed to communicate only with device (1B) 214. It may be appreciated that various custom and selective isolation rules may be specified (e.g., a device may be allowed to communicate with 3 devices, and may be blocked from communicating with 8 other devices).

Figure 2D:
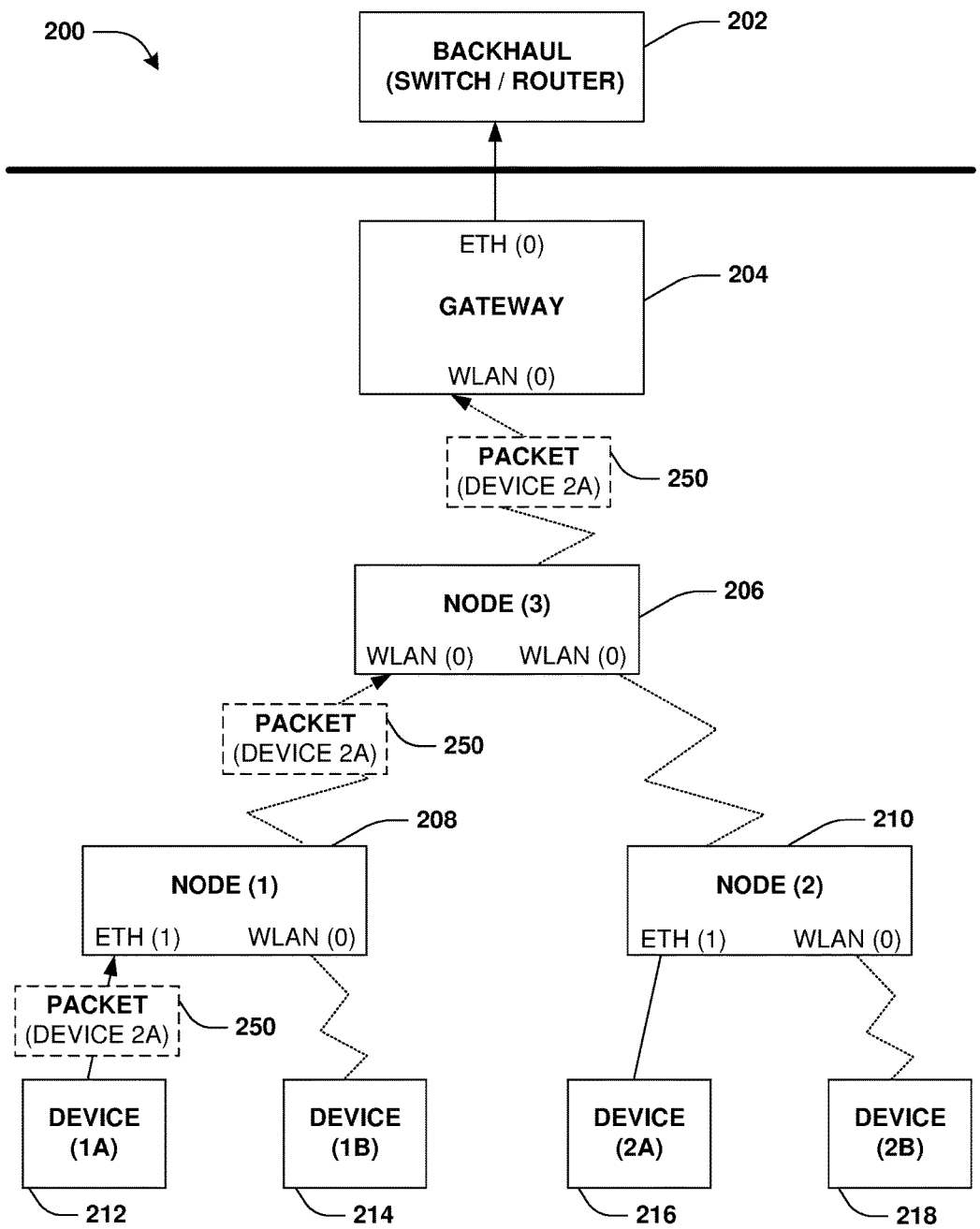
FIG. 2D is a component block diagram illustrating an exemplary system for providing network isolation, where a packet is routed upstream to a backhaul device, using alternative routing tables, and is allowed based upon an isolation rule.
Figure 2E:
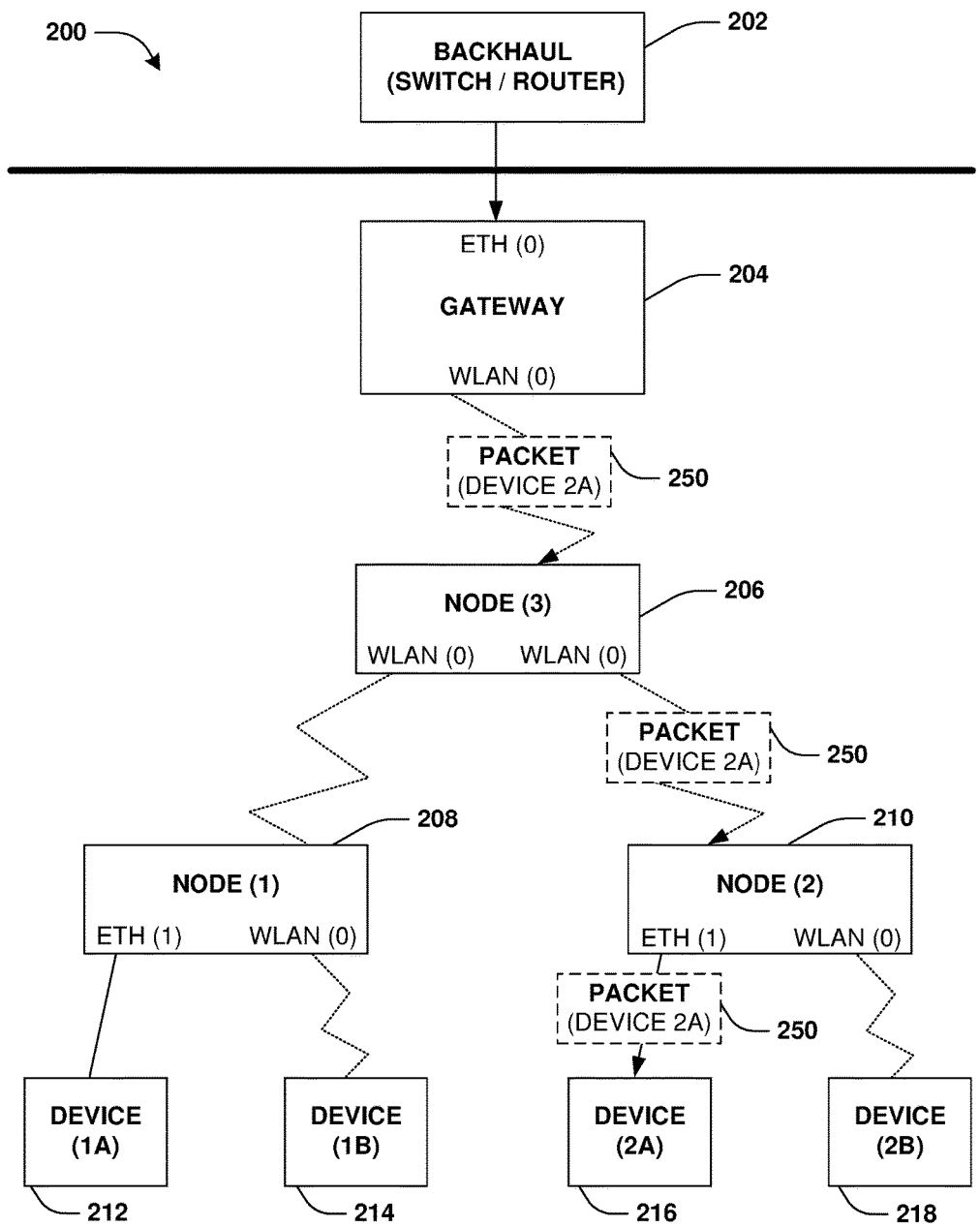
FIG. 2E is a component block diagram illustrating an exemplary system for providing network isolation, where a packet is routed downstream, using main routing tables, to a destination device.

FIG. 2D illustrates the device (1A) 212 originating a packet 250 with device (2A) 216 as a destination recipient. The device (1A) 212 may route the packet 250 over the wired connection to the first node 208. The first node 208 may determine that the packet 250 was not received from upstream (e.g., not received from the third node 206 that is a device upstream of the first node 208), and thus was received downstream. Accordingly, the first node 208 may utilize the first higher priority rule 220a to determine that the first alternative routing table 222 is to be used to route the packet 250. The first alternative routing table 222 indicates that the packet 250 should be routed upstream to the third node 206, and thus the first node 208 may route the packet 250 to the third node 206. A wireless driver associated with the third node 206 may mark the packet 250 with a mark indicating that the packet 250 was received from downstream. Accordingly, the third node 206 may utilize the third higher priority rule 226a to determine that the third alternative routing table 228 is to be used to route the packet 250. The third alternative routing table 228 indicates that the packet 250 should be routed upstream to the gateway 204, and thus the third node 206 may route the packet 250 to the gateway 204.

The gateway 204 may evaluate an interface over which the packet 250 was received to determine that the packet 250 was received from downstream. Accordingly, the gateway 204 may utilize the higher priority rule specifying that the first alternative routing table 242 is to be used to route the packet 250. In an example, the first alternative routing table 242 may comprises an entry for the device (2A) 216 (e.g., because the device (A1) 212 and the device (2A) 216 are within the same VLAN) indicating that the packet 250 should be routed to the third node 206. The third node 206 may route the packet 250 to the second node 210 using the third main routing table 230 based upon the third lower priority routing rule 226b. The second node 210 may route the packet to the device (2A) 216 using the second main routing table based upon a lower priority routing rule defined for the second node 210. In this way, communication may be selectively allowed between certain devices using the isolation rules 246.

Figure 2F:
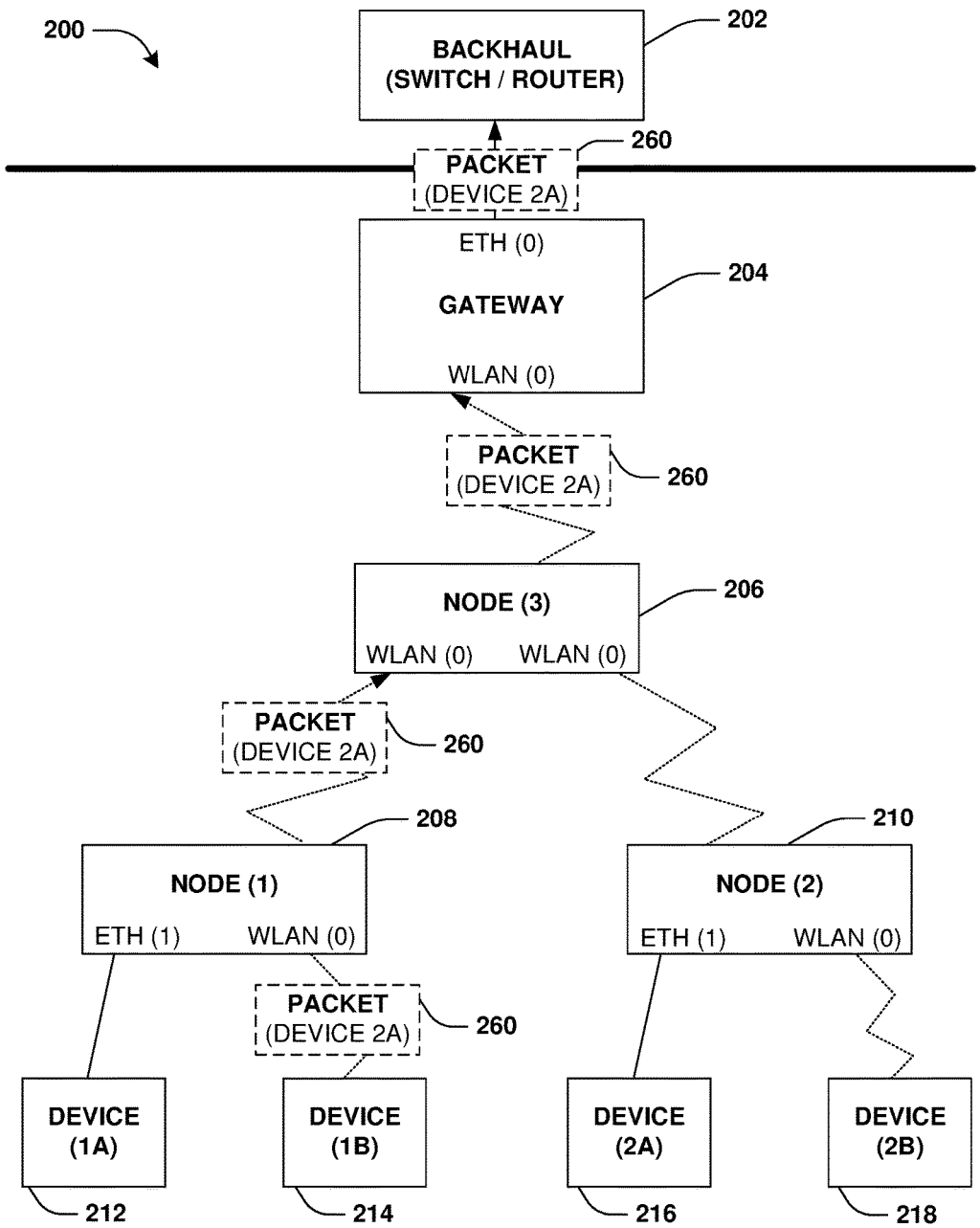
FIG. 2F is a component block diagram illustrating an exemplary system for providing network isolation, where a packet is routed upstream to a backhaul device, using alternative routing tables, and is blocked based upon an isolation routing rule.

FIG. 2F illustrates the device (1B) 214 originating a packet 260 with device (2A) 216 as the destination recipient.

The device (1B) 214 may route the packet 260 over the wireless connection to the first node 208, and thus a wireless driver associated with the first node 208 may mark the packet 260 as coming from downstream. Accordingly, the first node 208 may utilize the second higher priority rule 220b to determine that the first alternative routing table 222 is to be used to route the packet 260. The first alternative routing table 222 indicates that the packet 260 should be routed upstream to the third node 206, and thus the first node 208 may route the packet 260 to the third node 206. A wireless driver associated with the third node 206 may mark the packet 260 with a mark indicating that the packet 260 was received from downstream. Accordingly, the third node 206 may utilize the third higher priority rule 226a to determine that the third alternative routing table 228 is to be used to route the packet 260. The third alternative routing table 228 indicates that the packet 260 should be routed upstream to the gateway 204, and thus the third node 206 may route the packet 260 to the gateway 204. The gateway 204 may evaluate an interface over which the packet 260 was received to determine that the packet 260 was received from downstream. Accordingly, the gateway 204 may utilize the higher priority rule specifying that the second alternative routing table 243 is to be used to route the packet 260. The second alternative routing table 243 indicates that the packet 260 should be routed upstream to the backhaul device 202 by default because the second alternative routing table 243 does not comprise an entry for device (2A) 216 because device (2A) 216 is in a different VLAN than device (1B) 214, and thus the gateway 204 may route the packet 260 to the backhaul device 202. The backhaul device 202 may block the packet 260 based upon the isolation rules 246 indicating that the device (1B) 214 is only allowed to communicate with device (2B) 218 and thus is isolated from communicating with device (2A) 216. In this way, communication may be selectively isolated between certain devices using the isolation rules 246.

Figure 3A:
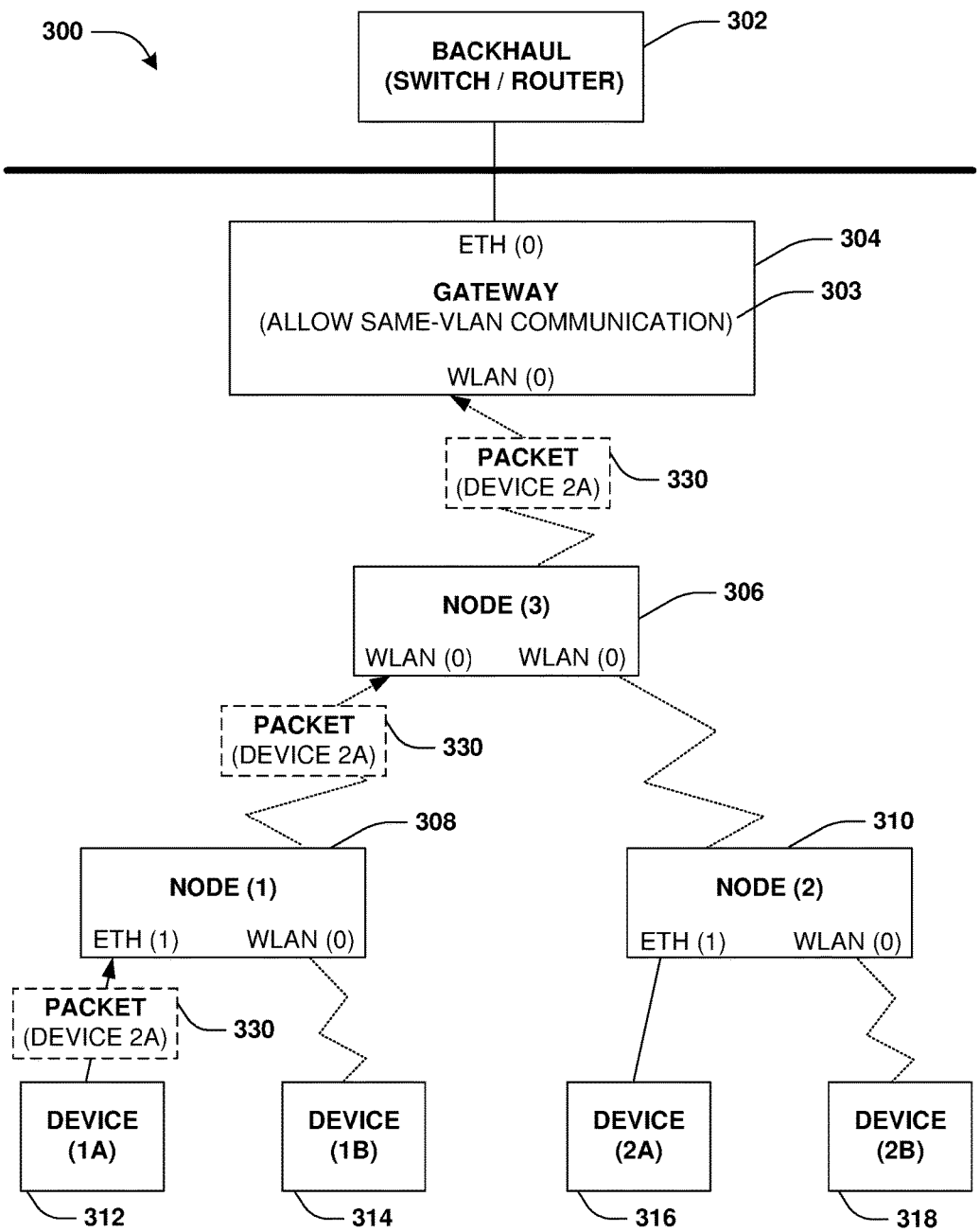
FIG. 3A is a component block diagram illustrating an exemplary system for providing network isolation.
Figure 3B:
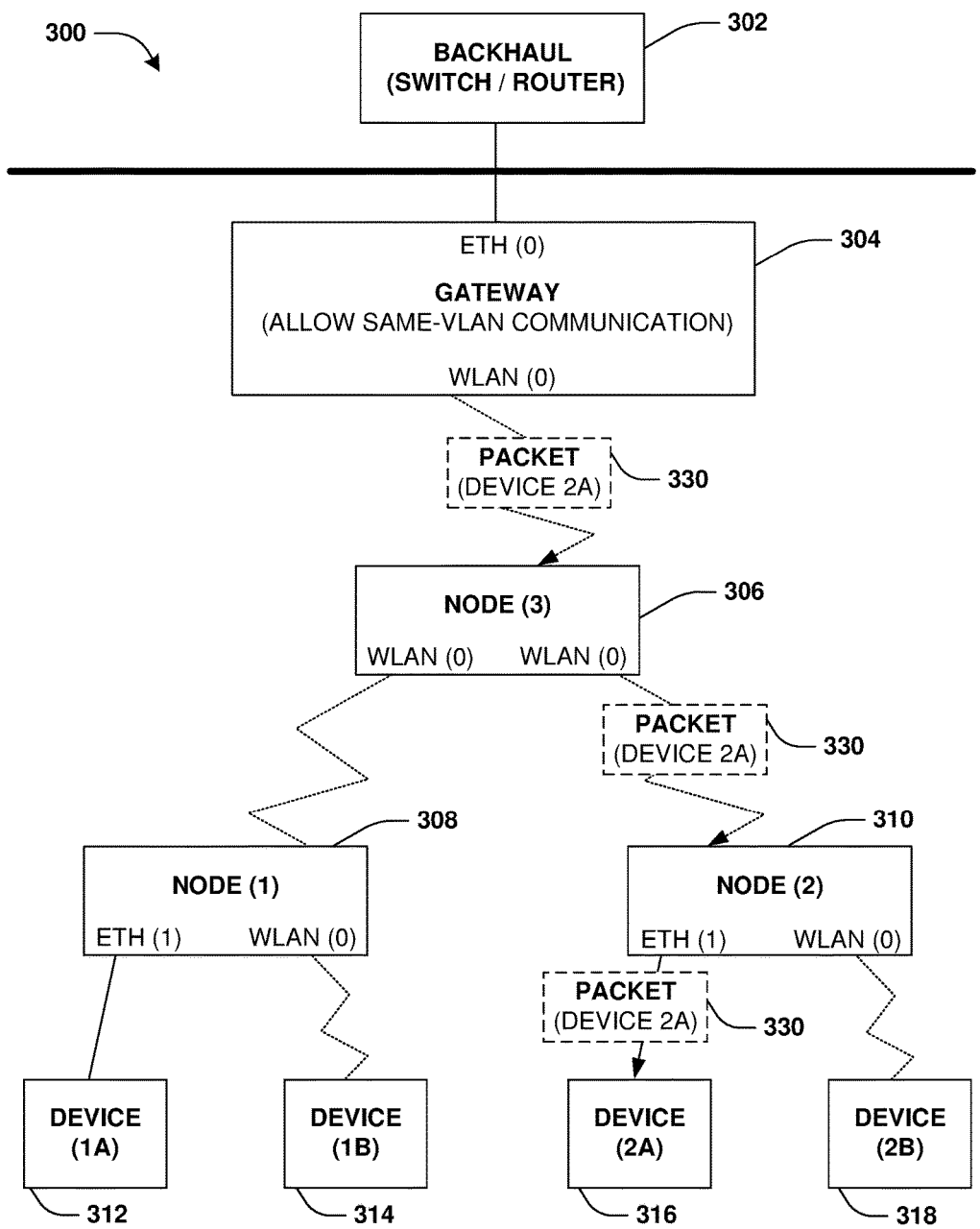
FIG. 3B is a component block diagram illustrating an exemplary system for providing network isolation, where a packet is routed downstream, using main routing tables, to a destination.

FIGS. 3A-3B illustrate examples of a system 300 for providing network isolation. FIG. 3A illustrates a wireless mesh network comprising a first node 308, a second node 310, a third node 306, a gateway 304, and/or one or more devices. It may be appreciated that the wireless mesh network may comprise different or other nodes and/or devices. A device (1A) 312 may be connected to the first node 308 through a wired connection such as using Ethernet connectivity ETH (1). A device (1B) 314 may be connected to the first node 308 through a wireless connection such as using a wireless local area network WLAN (0). A device (2A) 316 may be connected to the second node 310 through a wired connection such as using the Ethernet connectivity ETH (1). A device (2B) 318 may be connected to the second node 310 through a wireless connection such as using the wireless local area network WLAN (0). The first node 308 and the second node 310 may be connected to the third node 306 through wireless connections such as using the wireless local area network WLAN (0). The third node 306 may be connected to the gateway 304 through a wireless connection such as using the wireless local area network WLAN (0). The gateway 304 may be connected to a backhaul device 302 (e.g., a switch or router) over a wired connection such as using Ethernet connectivity ETH (0).

The gateway 304 may be configured with same-virtual local area network routing rules 303 specifying that packet are allowed to be routed by the gateway 304 between devices within a same virtual local area network and that packets are not allowed to be routed by the gateway between devices within different virtual local area networks. For example, device (1A) 312 and device (2A) 316 may be within the same virtual local area network. The device (1A) 312 may originate a packet 330 having the device (2A) 316 as a destination recipient. The device (1A) 312 may route the packet 330 over the wired connection to the first node 308. The first node 308 may determine that the packet 330 was not received from upstream (e.g., not received from the third node 306 that is a device upstream of the first node 308), and thus was received downstream. Accordingly, the first node 308 may route the packet 330 to the third node 306 utilizing a first alternative routing table. A wireless driver associated with the third node 306 may mark the packet 330 with a mark indicating that the packet 330 was received from downstream. Accordingly, the third node 306 may route the packet 330 to the gateway 304 utilizing a second alternative routing table. The gateway 304 may evaluate an interface over which the packet 330 was received to determine that the packet 330 was received from downstream. Accordingly, the gateway 304 may evaluate the packet 330 utilizing the same-virtual local area network routing rules 303 to determine whether the packet 330 is allowed to be routed back downstream to the device (2A) 316.

FIG. 3B illustrates the gateway 304 routing the packet 330 back downstream to the device (2A) 316 based upon the same-virtual local area network routing rules 303 indicating that such communication is allowed because the device (1A) 312 and the device (2A) 316 are within the same virtual local area network. Accordingly, the gateway 304 may route the packet 330, in an unmarked state, downstream to the third node 306 utilizing a main routing table. Because the packet 330 was received from upstream and is not marked, the third node 306 may route the packet 330 to the second node 310. Because the packet 330 was received from upstream and is not marked, the second node 310 may route the packet 330 to the device (2A) 316.

The gateway 304 may block packets that are being communicated between devices within different virtual local area networks based upon the same-virtual local area network routing rules 303. In an example, if the device (1A) 312 and the device (2A) 316 were in different virtual local area networks, then the gateway 304 may have blocked the packet based upon the same-virtual local area network routing rules 303. In another example, if the device (1B) 314 is within a first virtual local area network and the device (2A) is within a second virtual local area network, then the gateway 304 may block a packet sent from the device (2A) 316 to the device (1B) 314 based upon the same-virtual local area network routing rules 303.

Figure 4:
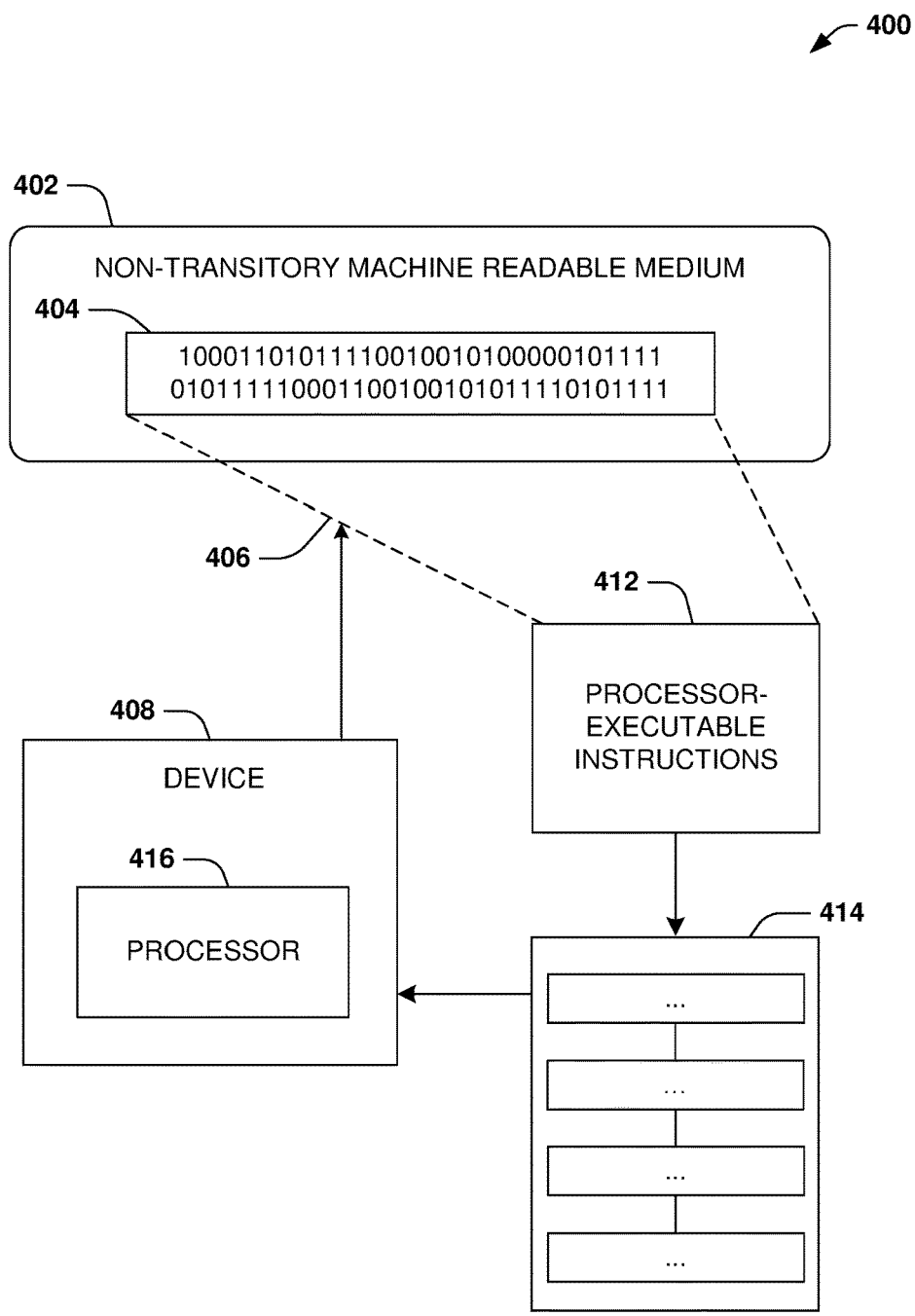
FIG. 4 is an illustration of an exemplary computing device-readable medium wherein processor-executable instructions configured to embody one or more of the provisions set forth herein may be comprised.

FIG. 4 is an illustration of a scenario 400 involving an example non-transitory machine readable medium 402. The non-transitory machine readable medium 402 may comprise processor-executable instructions 412 that when executed by a processor 416 cause performance (e.g., by the processor 416) of at least some of the provisions herein. The non-transitory machine readable medium 402 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 402 stores computer-readable data 404 that, when subjected to reading 406 by a device 408 (e.g., a read head of a hard disk drive, or a read operation invoked on a solid-state storage device), express the processor-executable instructions 412. In some embodiments, the processor-executable instructions 412, when executed cause performance of operations, such as at least some of the example method 100 of FIG. 1, for example. In some embodiments, the processor-executable instructions 412 are configured to cause implementation of a system, such as at least some of the example system 200 of FIGS. 2A-2F and/or at least some of the example system 300 of FIGS. 3A-3B, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
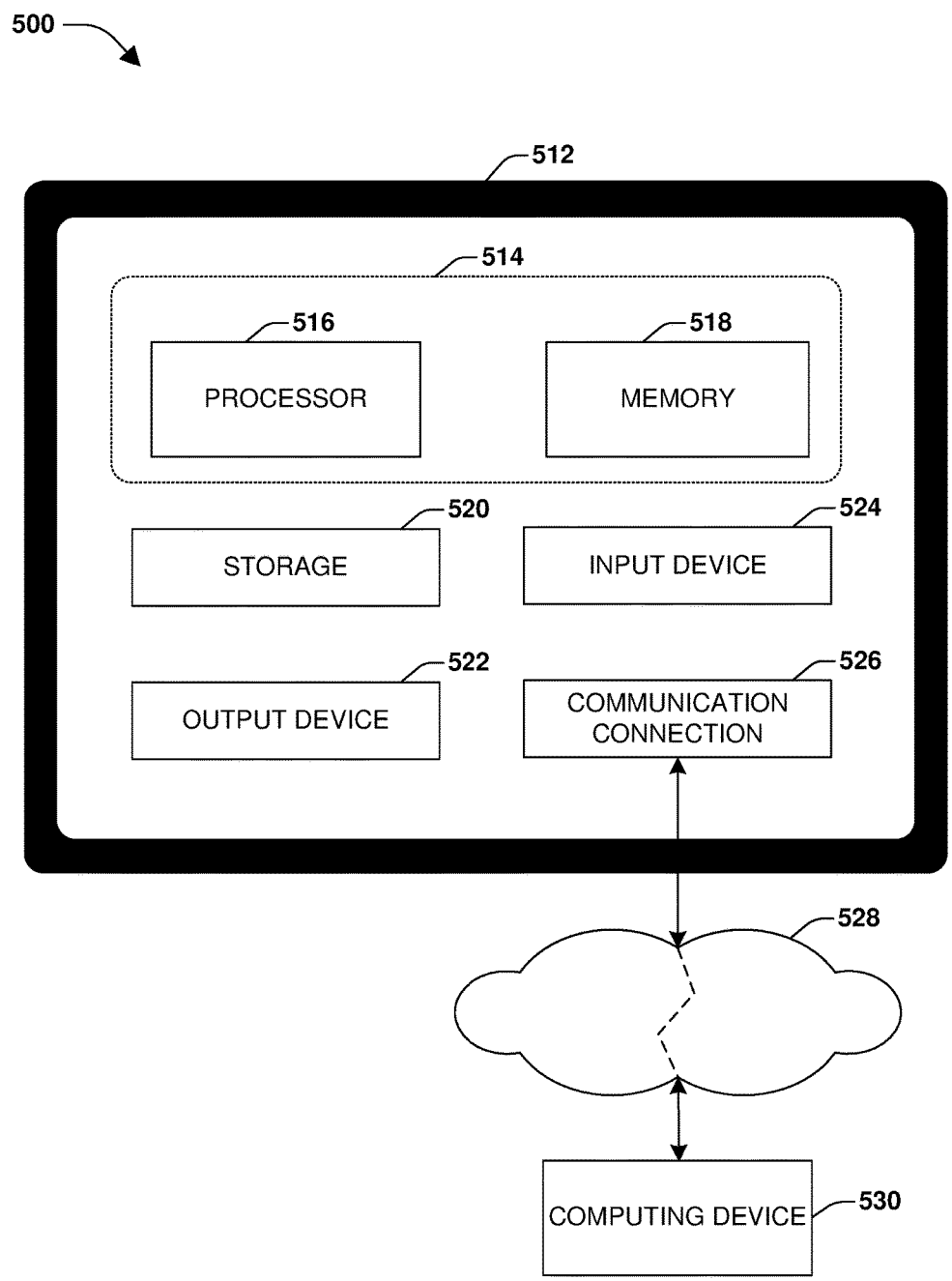
FIG. 5 illustrates an exemplary computing environment wherein one or more of the provisions set forth herein may be implemented.

FIG. 5 and the following discussion provide a brief, general description of a suitable computing environment to implement embodiments of one or more of the provisions set forth herein. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 5 illustrates an example of a system 500 comprising a computing device 512 configured to implement one or more embodiments provided herein. In one configuration, computing device 512 includes at least one processor 516 and memory 518. Depending on the exact configuration and type of computing device, memory 518 may be volatile (such as RAM, for example), non-volatile (such as ROM, flash memory, etc., for example) or some combination of the two. This configuration is illustrated in FIG. 5 by dashed line 514.

In other embodiments, device 512 may include additional features and/or functionality. For example, device 512 may also include additional storage (e.g., removable and/or non-removable) including, but not limited to, magnetic storage, optical storage, and the like. Such additional storage is illustrated in FIG. 5 by storage 520. In one embodiment, computer readable instructions to implement one or more embodiments provided herein may be in storage 520. Storage 520 may also store other computer readable instructions to implement an operating system, an application program, and the like. Computer readable instructions may be loaded in memory 518 for execution by processor 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 512. Computer storage media does not, however, include propagated signals. Rather, computer storage media excludes propagated signals. Any such computer storage media may be part of device 512.

Device 512 may also include communication connection 526 that allows device 512 to communicate with other devices. Communication connection 526 may include, but is not limited to, a modem, a Network Interface Card (NIC), an integrated network interface, a radio frequency transmitter/receiver, an infrared port, a USB connection, or other interfaces for connecting computing device 512 to other computing devices. Communication connection 526 may include a wired connection or a wireless connection. Communication connection 526 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 512 may include input device 524 such as keyboard, mouse, pen, voice input device, touch input device, infrared cameras, video input devices, and/or any other input device. Output device 522 such as one or more displays, speakers, printers, and/or any other output device may also be included in device 512. Input device 524 and output device 522 may be connected to device 512 via a wired connection, wireless connection, or any combination thereof. In one embodiment, an input device or an output device from another computing device may be used as input device 524 or output device 522 for computing device 512.

Components of computing device 512 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 512 may be interconnected by a network. For example, memory 518 may be comprised of multiple physical memory units located in different physical locations interconnected by a network.

Those skilled in the art will realize that storage devices utilized to store computer readable instructions may be distributed across a network. For example, a computing device 530 accessible via a network 528 may store computer readable instructions to implement one or more embodiments provided herein. Computing device 512 may access computing device 530 and download a part or all of the computer readable instructions for execution. Alternatively, computing device 512 may download pieces of the computer readable instructions, as needed, or some instructions may be executed at computing device 512 and some at computing device 530.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for providing network isolation comprising:
receiving, at a node, a packet;
responsive to determining that the packet was received from a device upstream of the node:
utilizing a first routing rule, having a first priority, to determine that a main routing table is to be used for routing the packet downstream; and
utilizing a main route, within the main routing table, to route the packet downstream for reaching a destination device that is a destination recipient of the packet; and
responsive to determining that the packet was received from a device downstream of the node:
utilizing a second routing rule, having a second priority that is different from the first priority, to determine that an alternative routing table is to be used for routing the packet upstream; and
utilizing an alternative route, within the alternative routing table, to route the packet upstream to the device upstream of the node.

2. The method of claim 1, comprising:
receiving, at a gateway, the packet;
responsive to determining that the packet was received from a device upstream of the gateway:
utilizing a third routing rule to determine that a second main routing table is to be used for routing the packet downstream; and
utilizing a second main route, within the second main routing table, to route the packet downstream for reaching the destination device; and
responsive to determining that the packet was received from a device downstream of the gateway:
utilizing a fourth routing rule to determine that a second alternative routing table is to be used for routing the packet upstream; and
utilizing a second alternative route, within the second alternative routing table, to route the packet upstream to the device upstream of the gateway.

3. The method of claim 1, comprising:
receiving, at a gateway, the packet;
responsive to a source device, originating the packet, being within a same virtual local area network as the destination device, allowing the packet to be routed downstream from the gateway to the destination device in response to a second alternative routing table of the gateway comprising an entry for the destination device based upon a same-virtual local area network routing rule; and
responsive to the source device being within a different virtual local area network as the destination device, blocking the packet from being routed downstream to the destination device in response to the second alternative routing table not comprising the entry for the destination device, wherein the packet is routed to a backhaul device based upon a default route.

4. The method of claim 1, comprising:
receiving the packet;
responsive to an isolation rule specifying that a source device, originating the packet, is allowed to communicate with the destination device, routing the packet downstream to the destination device; and
responsive to the isolation rule specifying that the source device is blocked from communicating with the destination device, blocking the packet from being routed downstream to the destination device.

5. The method of claim 1, comprising:
storing an indication of the device upstream of the node; and
utilizing the indication to determine whether the packet was received from the device upstream of the node or the device downstream of the node.

6. A non-transitory machine readable medium having stored thereon processor-executable instructions that when executed cause performance of operations, the operations, comprising:
configuring a node with a first routing rule having a first priority and a second routing rule having a second priority that is different from the first priority, the first routing rule specifying that a first main routing table is to be used for routing a packet when received from a device upstream of the node, the second routing rule specifying that a first alternative routing table is to be used for routing the packet when received from a device downstream of the node;
configuring a gateway node with a third routing rule and a fourth routing rule, the third routing rule specifying that a second main routing table is to be used for routing the packet when received from a device upstream of the gateway, the fourth routing rule specifying that a second alternative routing table is to be used for routing the packet when received from a device downstream of the gateway; and
configuring an isolation rule to specify whether to block or allow routing of the packet, originating from a source device, to a destination device that is a destination recipient of the packet.

7. The non-transitory machine readable medium of claim 6, wherein the operations comprise:
instructing a driver module, associated with the node, to mark the packet with a mark indicating that the first alternative routing table is to be used for routing the packet when the packet is received from the device downstream of the node.

8. The non-transitory machine readable medium of claim 7, wherein the operations comprise:
instructing the driver module, associated with the node, to not mark the packet with the mark when the packet is received from the device upstream of the node.

9. The non-transitory machine readable medium of claim 6, wherein the first main routing table comprises a main route used to route the packet downstream to the destination device.

10. The non-transitory machine readable medium of claim 6, wherein the first alternative routing table comprises a first alternative route used to route the packet upstream from the node to an upstream device upstream of the node.

11. The non-transitory machine readable medium of claim 6, wherein the operations comprise:
configuring the first routing rule and the second routing rule as internet protocol (IP) routing rules for a layer-3 network layer supporting IP routing.

12. The non-transitory machine readable medium of claim 11, wherein the layer-3 network layer supports non-virtual local area network packets but not virtual local area network packets.

13. The non-transitory machine readable medium of claim 6, wherein the configuring comprises:
specifying within the isolation rule that the packet, originating from the source device and having the destination device as the destination recipient, is to be blocked from being routed downstream to the destination device.

14. The non-transitory machine readable medium of claim 6, wherein the configuring comprises:
specifying within the isolation rule that the packet, originating from the source device and having the destination device as the destination recipient, is to be routed in an unmarked state downstream to the destination device.

15. The non-transitory machine readable medium of claim 6, wherein the first priority has a lower priority than the second priority.

16. The non-transitory machine readable medium of claim 6, wherein the configuring a gateway comprises:
configuring the gateway to evaluate an interface over which the packet has arrived for determining whether the packet was received from the device upstream of the gateway or from the device downstream of the gateway.

17. The non-transitory machine readable medium of claim 6, wherein the configuring a gateway comprises:
configuring the gateway with a same-virtual local area network routing rule specifying that when the source device is within a same virtual local area network as the destination device, the packet is allowed to be routed downstream from the gateway to the destination device.

18. The non-transitory machine readable medium of claim 17, wherein the same-virtual local area network routing rule specifies that when the source device is within a different virtual local area network as the destination device, the packet is to be blocked from being routed downstream from the gateway to the destination device.

19. A computing device comprising:
a processor; and
memory comprising processor-executable instructions that when executed by the processor cause performance of operations, the operations comprising:
configuring a node with a first routing rule having a first priority and a second routing rule having a second priority that is different from the first priority, the first routing rule specifying that a first main routing table is to be used for routing a packet when received from a device upstream of the node, the second routing rule specifying that a first alternative routing table is to be used for routing the packet when received from a device downstream of the node; and
configuring a gateway with a same-virtual local area network routing rule specifying that:
when a source device, originating the packet, is within a same virtual local area network as a destination device that is a destination recipient of the packet, the packet is allowed to be routed downstream from the gateway to the destination device; and when the source device is within a different virtual local area network as the destination device, the packet is to be blocked from being routed downstream from the gateway to the destination device.

20. The computing device of claim 19, wherein the first routing rule, the second routing rule, and the same-virtual local area network routing rule are configured as internet protocol (IP) routing rules for a layer-3 network layer supporting IP routing.

* * * * *